US009781556B2

(12) United States Patent
Johnsson et al.

(10) Patent No.: US 9,781,556 B2
(45) Date of Patent: Oct. 3, 2017

(54) NETWORK-ASSISTED TO DIRECT DEVICE DISCOVERY SWITCH

(71) Applicant: Intel Corporation, Santa Clara, CA (US)

(72) Inventors: Kerstin Johnsson, Palo Alto, CA (US); Alexandre Saso Stojanovski, Paris (FR); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/141,222

(22) Filed: Dec. 26, 2013

(65) Prior Publication Data

US 2014/0301289 A1   Oct. 9, 2014

Related U.S. Application Data

(60) Provisional application No. 61/809,157, filed on Apr. 5, 2013.

(51) Int. Cl.
*H04W 4/02* (2009.01)
*H04W 76/02* (2009.01)
(Continued)

(52) U.S. Cl.
CPC ............. *H04W 4/021* (2013.01); *H04L 67/16* (2013.01); *H04L 67/28* (2013.01); *H04W 4/00* (2013.01);
(Continued)

(58) Field of Classification Search
CPC ..... H04W 72/02; H04W 72/023; H04W 4/00; H04W 4/02; H04W 4/021; H04W 72/00;
(Continued)

(56) References Cited

U.S. PATENT DOCUMENTS

2004/0003133 A1   1/2004   Pradhan et al.
2008/0183828 A1   7/2008   Sehgal et al.
(Continued)

FOREIGN PATENT DOCUMENTS

CN   101465879 A   6/2009
CN   105009477 A   10/2015
(Continued)

OTHER PUBLICATIONS

"U.S. Appl. No. 14/141,236, Non Final Office Action mailed Jun. 5, 2015", 14 pgs.
"U.S. Appl. No. 14/141,236, Preliminary Amendment filed Dec. 22, 2014", 7 pgs.
"U.S. Appl. No. 14/141,236, Response filed Sep. 8, 2015 to Non Final Office Action mailed Jun. 5, 2015", 11 pgs.
(Continued)

*Primary Examiner* — Feben M Haile
(74) *Attorney, Agent, or Firm* — Schwegman Lundberg & Woessner, P.A.

(57) ABSTRACT

Embodiments for providing network-assisted to direct device discovery switch are generally described herein. In some embodiments, location information is received at an evolved packet core (EPC) from at least a first and a second user equipment (UE). A network-assisted device-to-device (D2D) request is received from the first UE for establishing a D2D wireless connection with the second UE. Proximity of the first UE and the second UE are monitored. Before detecting the second UE being in proximity to the first UE, direct discovery is determined to be more resource efficient than continuing to provide network-assisted D2D discovery. An indication is provided to the first UE and the second UE to perform direct discovery based on information provided in the indication.

23 Claims, 6 Drawing Sheets

(51) Int. Cl.
*H04W 72/04* (2009.01)
*H04W 4/00* (2009.01)
*H04L 29/08* (2006.01)
*H04W 52/24* (2009.01)
*H04W 84/12* (2009.01)
*H04W 52/10* (2009.01)

(52) U.S. Cl.
CPC ......... *H04W 4/008* (2013.01); *H04W 52/244* (2013.01); *H04W 72/042* (2013.01); *H04W 72/0413* (2013.01); *H04W 72/0473* (2013.01); *H04W 76/021* (2013.01); *H04W 76/023* (2013.01); *H04W 52/10* (2013.01); *H04W 84/12* (2013.01)

(58) Field of Classification Search
CPC ............. H04W 72/04; H04W 72/0413; H04W 72/042; H04W 76/00; H04W 76/02; H04W 76/021; H04W 76/023
See application file for complete search history.

(56) References Cited

U.S. PATENT DOCUMENTS

| | | | |
|---|---|---|---|
| 2009/0164574 A1* | 6/2009 | Hoffman | H04W 4/02 709/204 |
| 2009/0177782 A1 | 7/2009 | Blatherwick et al. | |
| 2010/0121744 A1 | 5/2010 | Belz et al. | |
| 2010/0332668 A1 | 12/2010 | Shah et al. | |
| 2011/0103264 A1 | 5/2011 | Wentink | |
| 2011/0258313 A1 | 10/2011 | Mallik et al. | |
| 2012/0011247 A1* | 1/2012 | Mallik et al. | 709/224 |
| 2012/0243431 A1 | 9/2012 | Chen et al. | |
| 2013/0083779 A1 | 4/2013 | Ahn et al. | |
| 2014/0022986 A1* | 1/2014 | Wu | H04W 48/16 370/328 |
| 2014/0066058 A1* | 3/2014 | Yu et al. | 455/434 |
| 2014/0112194 A1* | 4/2014 | Novlan | H04W 8/005 370/254 |
| 2014/0301270 A1 | 10/2014 | Johnsson et al. | |

FOREIGN PATENT DOCUMENTS

| | | |
|---|---|---|
| KR | 102012007425 A | 7/2012 |
| TW | 201446041 A | 12/2014 |
| TW | 201503742 A | 1/2015 |
| WO | WO-2012091418 A2 | 7/2012 |
| WO | WO-2013044864 A1 | 4/2013 |
| WO | WO-2013044885 A1 | 4/2013 |
| WO | WO-2014165481 A1 | 10/2014 |
| WO | WO-2014165675 A1 | 10/2014 |

OTHER PUBLICATIONS

"International Application Serial No. PCT/US2014/032482, International Preliminary Report on Patentability mailed Oct. 15, 2015", 8 pgs.
"International Application Serial No. PCT/US2014/032482, International Search Report mailed Aug. 14, 2014", 3 pgs.
"International Application Serial No. PCT/US2014/032482, Written Opinion mailed Aug. 14, 2014", 6 pgs.
"International Application Serial No. PCT/US2014/032829, International Preliminary Report on Patentability mailed Oct. 15, 2015", 6 pgs.
"International Application Serial No. PCT/US2014/032829, International Search Report mailed Aug. 13, 2014", 3 pgs.
"International Application Serial No. PCT/US2014/032829, Written Opinion mailed Aug. 13, 2014", 4 pgs.
"New work item proposal for Further Enhancements to LTE TDD for DL-UL Interference Management and Traffic Adaptation", RP-121772: 3GPP TSG-RAN Meeting #58-Performance, (Dec. 2012), 6 pgs.
"New work item proposal for Further Enhancements to LTE TDD for DL-UL Interference Management and Traffic Adaptation", RP-121772: 3GPP TSG-RAN Meeting #58—Feature, (Dec. 2012), 4 pgs.
"New work item proposal for Further Enhancements to LTE TDD for DL-UL interference Management and Traffic Adaptation", RP-121772: 3GPP TSG-RAN Meeting #58-Core, (Dec. 2012), 5 pgs.
"Taiwanese Application Serial No. 103112531, Office Action mailed May 26, 2015", w/ English Search Report, 15 pgs.
"Taiwanese Application Serial No. 103112550, Office Action mailed Aug. 24, 2015", W/ English Search Reports, 6 pgs.
"TS 36.111 Sections 4 and 5 LMU RF Text Proposals", TSG-RAN Working Group 4 (Radio) meeting #67 R4-133137, (May 2013), 11 pgs.
"European Application Serial No. 14778052.2, Extended European Search Report mailed Sep. 15, 2016", 8 pgs.
"Operator Managed and Operator Assisted D2D", Intel, 3GPP Draft; S1-120063-Managed or Assisted D2D, 3rd Generation Partnership Project (3GPP), Mobile Competence Centre ; 650, Route Des Lucioles ; F-06921 Sophia-Antipolis Cedex ; France, vol. SA WG1, No. Kyoto, Japan Feb. 13, 2012-Feb. 17, 2012, (Feb. 6, 2012), 1-5.
Li, Zhe, "Performance Analysis of Network Assisted Neighbor Discovery Algorithms", [Online] retrieved from the internet: <http://kth.diva-portal.org/smash/get/diva2:602605/FULLTEXT01> [retrieved on Jul. 8, 2013], (Aug. 16, 2012).
"U.S. Appl. No. 14/141,236, Response filed Jun. 26, 2017 to Final Office Action dated Dec. 19, 2016", 10 pgs.
"Chinese Application Serial No. 201480011484.8, Office Action dated Jul. 4, 2017", w/English Translation, 30 pgs.

* cited by examiner

NETWORK-ASSISTED TO DIRECT DEVICE DISCOVERY SWITCH

CLAIM OF PRIORITY

This application claims the benefit of priority under 35 U.S.C. 119(e) to U.S. Provisional Patent Application Ser. No. 61/809,157, filed on Apr. 5, 2013, which is incorporated herein by reference in its entirety.

BACKGROUND

Device-to-Device (D2D) wireless communication techniques may be used to perform peer-to-peer/point-to-point (P2P) communications among mobile devices and networks in a variety of settings. D2D communications between mobile devices may be designed to complement the use of centralized communications from a wireless base station, for example, centralized station-to-mobile communications from an evolved NodeB (eNodeB) in a carrier network operating with a standard from a 3GPP Long Term Evolution/Long Term Evolution-Advanced (LTE/LTE-A) standards family, or from an access point (AP) in a Wi-Fi network operating with a standard from a Institute of Electrical and Electronics Engineers (IEEE) 802.11 standards family.

D2D direct communications are limited to devices located within the communication range of the wireless protocol or network configuration being used. However, a particular user may not be aware whether D2D communication-capable devices or known users associated with D2D communication-capable devices are within communication range, or whether such devices or users are currently or are prospectively in proximity to the particular user.

In current Device-to-Device (D2D) technologies, UEs advertise and/or search for advertisements from other UEs in order determine whether they are in D2D range. However, this results in a waste of radio and battery resources. To address this issue, a UE may request help from the network to determine if/when another UE is in proximity and, when proximity is detected, expedite the process of direct discovery. This process is referred to as network-assisted device discovery. In network-assisted device discovery, the network may monitor UE locations and inform UEs when there is a high probability that they are in range. Then do UEs engage in direct discovery to confirm that they are in D2D range.

Network assisted device discovery significantly reduces resource waste. However, there are some cases when a UE has requested proximity detection of a large number of UEs over the same period of time. In such cases, it may be more resource efficient to switch the UE to Direct Discovery once the network determines that large numbers of the requested UEs are approaching the UE's proximity.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Figure 1:
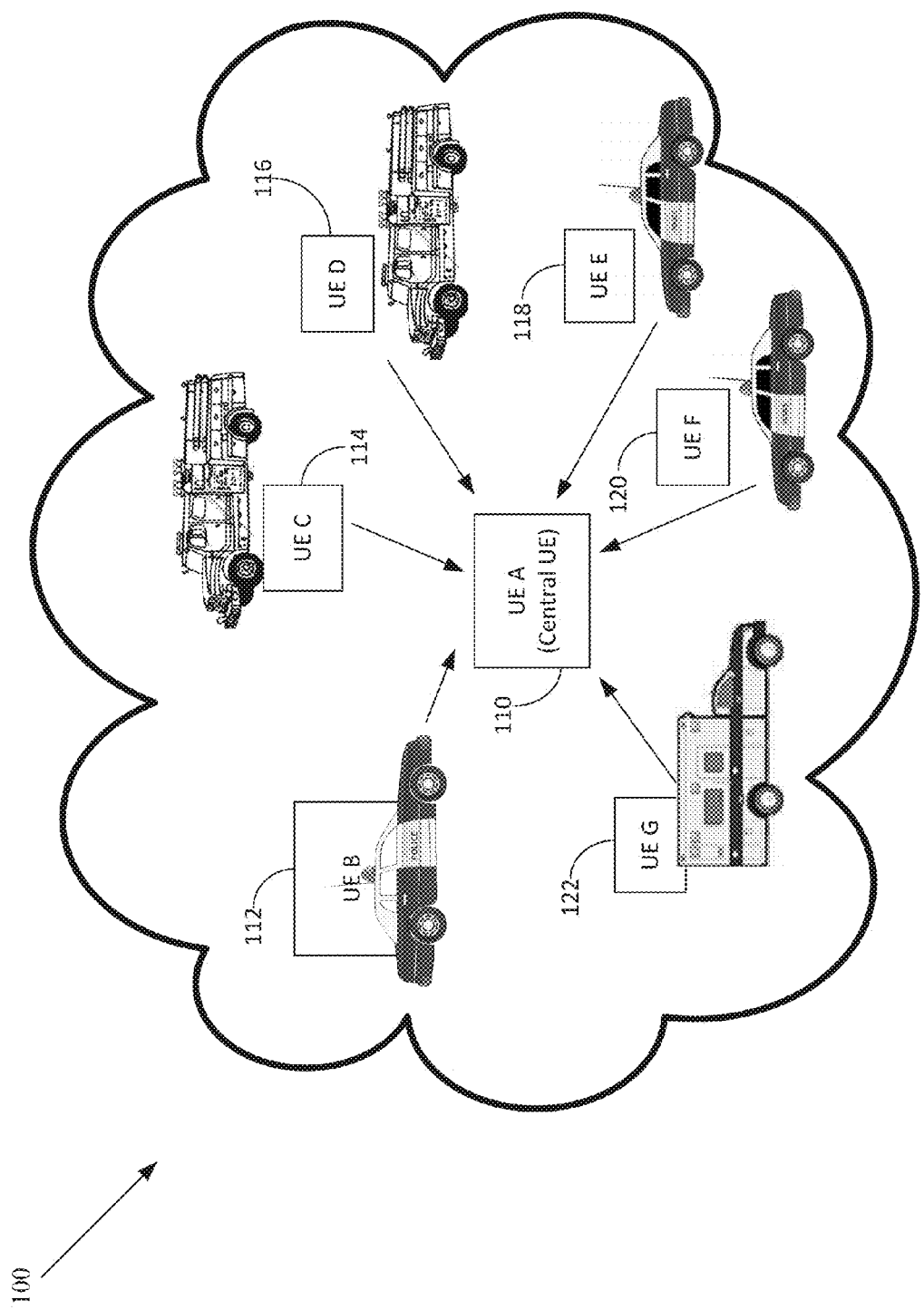
FIG. 1 illustrates a large numbers of user equipments (UEs) approaching a central UE's proximity according to an embodiment.

FIG. 1 illustrates a large numbers of user equipments (UEs) approaching a central UE's proximity 100 according to an embodiment. There are some cases when a UE, e.g., requesting UE 110, has requested proximity detection of a large number of UEs, e.g., UEs B-G 112-122, over the same period of time. In such cases, it may be more resource efficient to switch the requesting UE 110 to Direct Discovery once the network determines that large numbers of the requested UEs, e.g., UEs B-G 112-122, are approaching the proximity of the requesting UE 110. Examples described herein provide a discovery scheme that uses network-assisted device discovery, but switches to direct discovery before proximity between UEs B-G 112-122 and requesting UE 110 is reached/detected when the use case indicates that direct discovery would be more efficient at some point. For example, this scenario may be particularly relevant in public safety/disaster relief scenarios where the UEs B-G 112-122 are converging on the same emergency scene where requesting UE 110 is located. Accordingly, network-assisted device discovery is combined with direct discovery to provide the most efficient scheme for each use case, i.e. UE 110 locations and movements.

Figure 2:
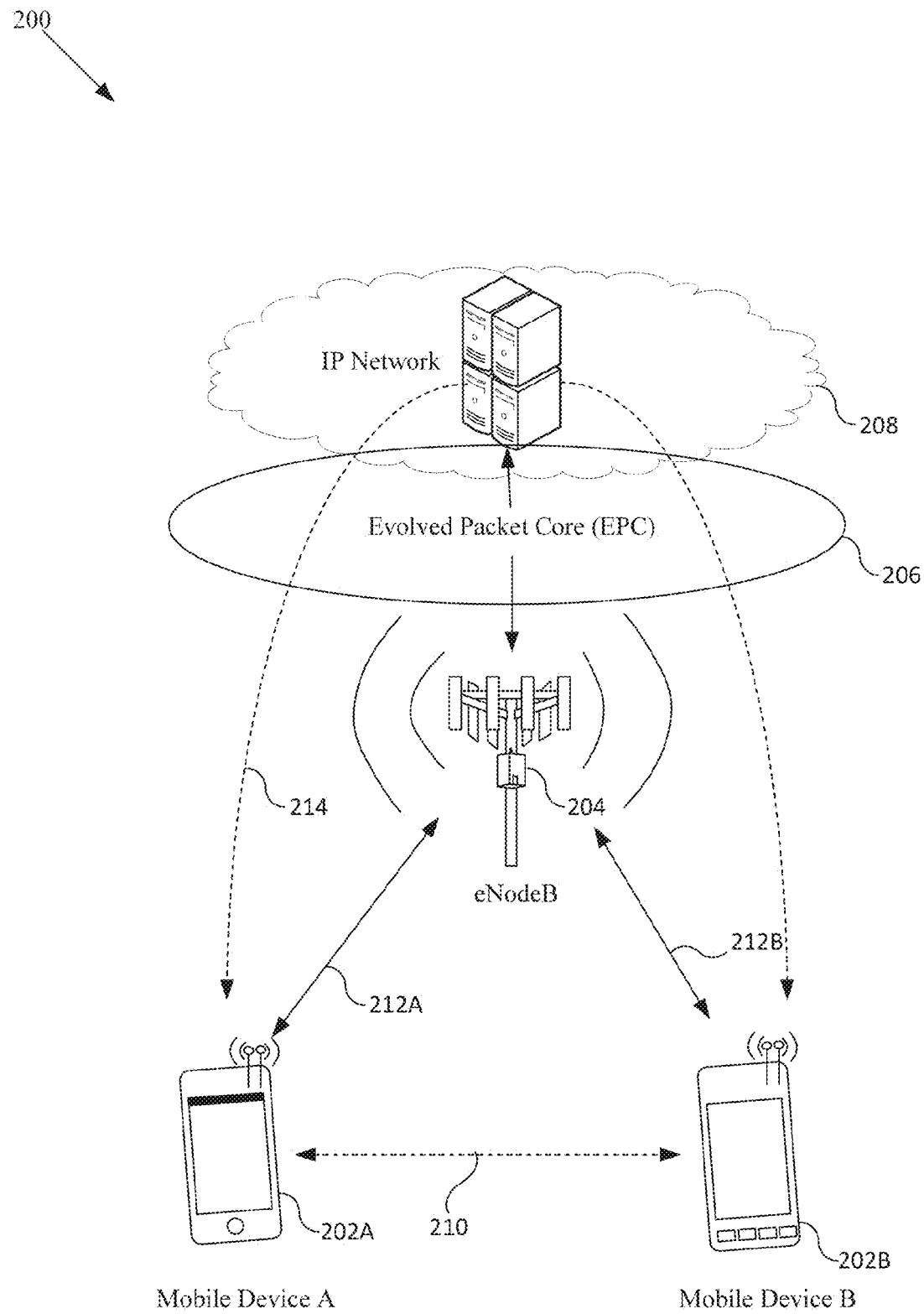
FIG. 2 provides an illustration of an example network configuration 200 for facilitating direct Device-to-Device (D2D) wireless communications through a carrier-managed network according to one example.

FIG. 2 provides an illustration of an example network configuration 200 for facilitating direct Device-to-Device (D2D) wireless communications through a carrier-managed network according to one example. Within the network configuration 200, a series of multi-mode mobile devices, e.g., mobile device 202A and a mobile device 202B, are arranged for communication with a carrier-managed network and with a D2D network. The carrier-managed network may operate in accordance with a Third Generation Partnership Project (3GPP) LTE/LTE-A (Long Term Evolution/Long Term Evolution-Advanced) or other suitable wireless wide area network (WWAN) protocol, and may include a configuration to provide wireless network communications from an evolved Node B (eNodeB) 204 in operation with an evolved packet core (EPC) 206, for communication of data to an Internet Protocol (IP) network 208. The carrier network may be configured for facilitating network communications to the mobile device 202A and the mobile device 202B, using LTE/LTE-A communication links 212A, 212B respectively.

Communications between the mobile device 202A and the mobile device 202B are illustrated as facilitated via the Internet Protocol (IP) network 208 through an infrastructure communication link 214. The infrastructure communication link 214 is established as the mobile device 202A and the mobile device 202B subscribe to a common carrier network and conduct communication with a common eNodeB 204. However, the infrastructure communication link 214 may also be established with use of separate eNodeBs or carrier networks.

D2D communications between the mobile device 202A and the mobile device 202B are facilitated through a D2D communication link 210. The D2D communication link 210 may utilize any number of WWAN, WLAN, or wireless personal area network (WPAN) protocols, such as a WLAN Wi-Fi direct network protocol (operating in accordance with a standard from the IEEE 802.11 standards family) or a WPAN Bluetooth protocol (operating in accordance with a Bluetooth standard as defined by the Bluetooth Special Interest Group). The D2D communication link 210 as shown may be configured for direct point-to-point connections between devices, but may also be facilitated through indirect peer-to-peer and multi-node connections.

Operations at the carrier network to establish the D2D communication link may be performed within systems of the carrier network, for example, within the EPC 206. The operations of the EPC 206 may include assisting discovery of the mobile device 202B from the perspective of the mobile device 202A, and assisting discovery of the mobile device 202A from the perspective of the mobile device 202B. For example, if the mobile device 202A suspects or is otherwise informed that the mobile device 202B is in proximity (e.g., is in communication range), or otherwise wishes to attempt a connection to the mobile device 202B, the mobile device 202A can request D2D discovery assistance from the EPC 206. As one example, the EPC 206 may perform operations to confirm with the mobile device 202B whether the device will allow the establishment of a D2D connection, and exchange information to assist D2D discovery and connection operations. As another example, the operator may also store these kinds of permissions in a database, and check them to see if the user has permitted access by another user before actually inquiring about permission. (A user may, for example, inform the network of these D2D permissions when it registers with the network). Thus, operations to confirm whether the establishment of the D2D connection is allowed may include a combination of policies or user interaction to verify the establishment of the D2D connection or certain D2D connection types.

Figure 3:
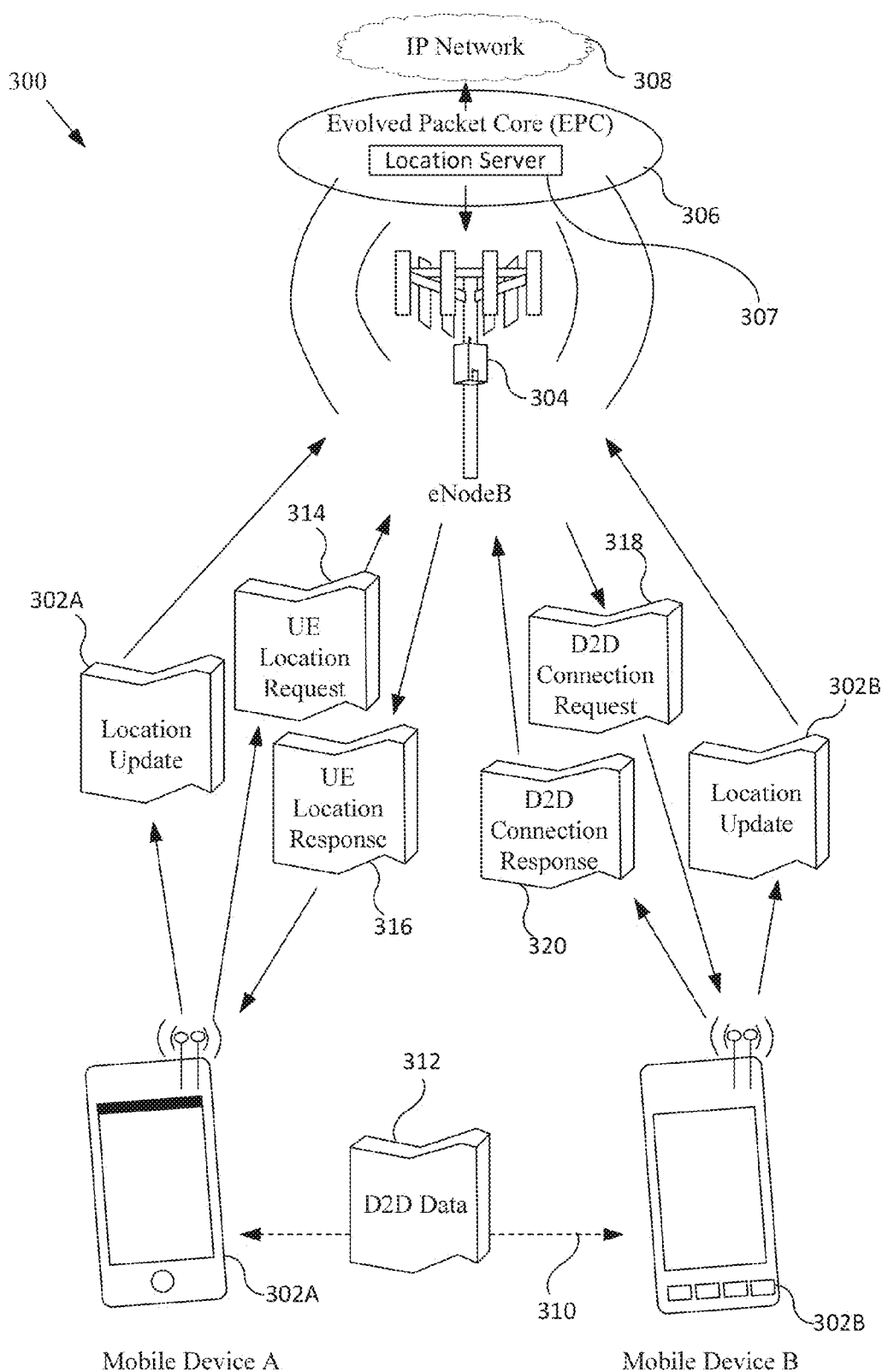
FIG. 3 provides an illustration of example data operations transmitted through a carrier-managed network for establishing a D2D communication link between a first mobile device and a second mobile device according to an example.

FIG. 3 provides an illustration of example data operations 300 transmitted through a carrier-managed network for establishing a D2D communication link 310 between the mobile device 302A and the mobile device 302B according to an example. The mobile devices interface with the carrier-managed network through various communications with an eNodeB 304. As further described below and in reference to the operation flow and flowcharts of FIGS. 4-5, the data operations 300 transmitted within the carrier-managed network via the eNodeB 304 may include the exchange and coordination of various data updates, requests, and responses relevant to establishment of a D2D connection.

As illustrated in FIG. 3, a series of location update messages 302A, 302B may be provided from each of the mobile devices, e.g., the mobile device 302A, and the mobile device 302B. The location update messages 302A, 302B may be incorporated with existing location services or location management data managed by the carrier-managed network, or incorporated into location data communicated to the EPC 306.

Location information from the location update messages 302A, 302B may be used by the carrier network, for example, to determine whether the mobile devices are in proximity to each other and are within range of establishing a D2D communication link 310 to transmit D2D data 312. The location information from the location update messages 302A, 302B may also be coordinated in connection with location services, e.g., a location server 307 of EPC 306. or another portion of the carrier-based network that tracks an approximate or precise location of the UEs.

The location information from the location update messages 302A, 302B may be used to detect and validate proximity of the pair of mobile devices within a communication range for establishing the D2D communication link 310. For example, as the mobile device 302A suspects that the mobile device 302B is in proximity (or otherwise decides to initiate a D2D connection to mobile device 302B), the mobile device 302A may request device discovery assistance from the operator network, e.g., EPC 306, for the mobile device 302B. The request for device discovery assistance may be sent from the mobile device 302A through one or more user equipment (UE) location requests 314 transmitted from the mobile device 302A to the operator network via the eNodeB 304 in operation with an evolved packet core (EPC) 306 and an Internet Protocol (IP) network 308.

In response to a UE location request such as the UE location request 314, the carrier-managed network may verify whether the mobile device 302B is discoverable (e.g., allowing others to discover it) or otherwise interested in establishing a D2D connection with the mobile device 302A. The verification may be performed by confirming D2D permissions in network-level databases (permissions can be established during UE registration or via earlier inquiries), or it may include the transmission of a D2D connection request 318 to the mobile device 302B, and the receipt of a D2D connection response 320 from the mobile device 302B. Operations such as user interface prompts or policy verifications may be performed at or on behalf of the mobile device 302B to obtain authorization to establish the D2D connection.

Once the carrier-managed network verifies permission for mobile device 302A to connect directly with mobile device 302B, the carrier-based network may provide one or both of the UEs with information to assist with the D2D connection establishment. For example, this may include device discovery information communicated to the mobile device 302A communicated in a UE location response 316 received from via eNodeB 304. This device discovery information may also include parameters of establishing the connection, such as a time period during which the discovery is valid.

During the time period in which the discovery is valid, the UE that initiates the D2D communication link 310, e.g., the discovering UE such as mobile device 302A, may perform discovery operations to locate and establish a connection to the discovered UE, assisted by the device discovery information obtained from the EPC 306. For example, UEs identified by the EPC 306 as located proximate to each other may be identified with a D2D communication protocol using standard network scanning procedures, such as with Bluetooth "device discovery" or Wi-Fi "P2P find" modes. Proximate or within proximity for D2D communications herein refers to a first UE within a range of a scone UE to establish a direct connection between each other. In further examples, the UE location request 314 and the UE location response 316 may be used to obtain information about communication parameters, authentication information, security information, or other information used by a discovering device to locate and establish the connection to the discovered UE.

In Network Assisted Device Discovery, a UE requests help from the network to determine if/when another UE is in proximity and, when proximity is detected by the network, the process of direct discovery is expedited. For example, the network maintains location estimates of its UEs by periodically receiving location update messages from the UEs. A first UE requests network-assisted device discovery for other UEs, e.g., UEs B, during a window period. The network compares the locations of UE A and UE B to determine if UE B is in proximity of UE A. This is done throughout the window period. When proximity is detected between UE A and UE B, the network sends UE B a message indicating that UE A wants to connect, providing mutual ID information, e.g. temporary link layer IDs for use during Direct Discovery, and a discovery period. When/if UE B confirms, the network sends a message to UE A, confirming that UE B wants to connect and provides the mutual ID information and discovery period to UE A. UE A and UE B may then engage in Direct Discovery using their mutual ID information.

However, the above procedure does not consider the option of reverting to Direct Discovery before proximity is detected. As noted above, there are known use cases where a UE requests discovery of large numbers of UEs that happen to be converging on the UE's location at approximately the same time. In these cases, it may be more resource efficient to simply have the UE revert to periodically advertising its presence on the Direct Discovery channel once the network detects that a significant number of the requested UEs are approaching the UE's location.

Figure 4:
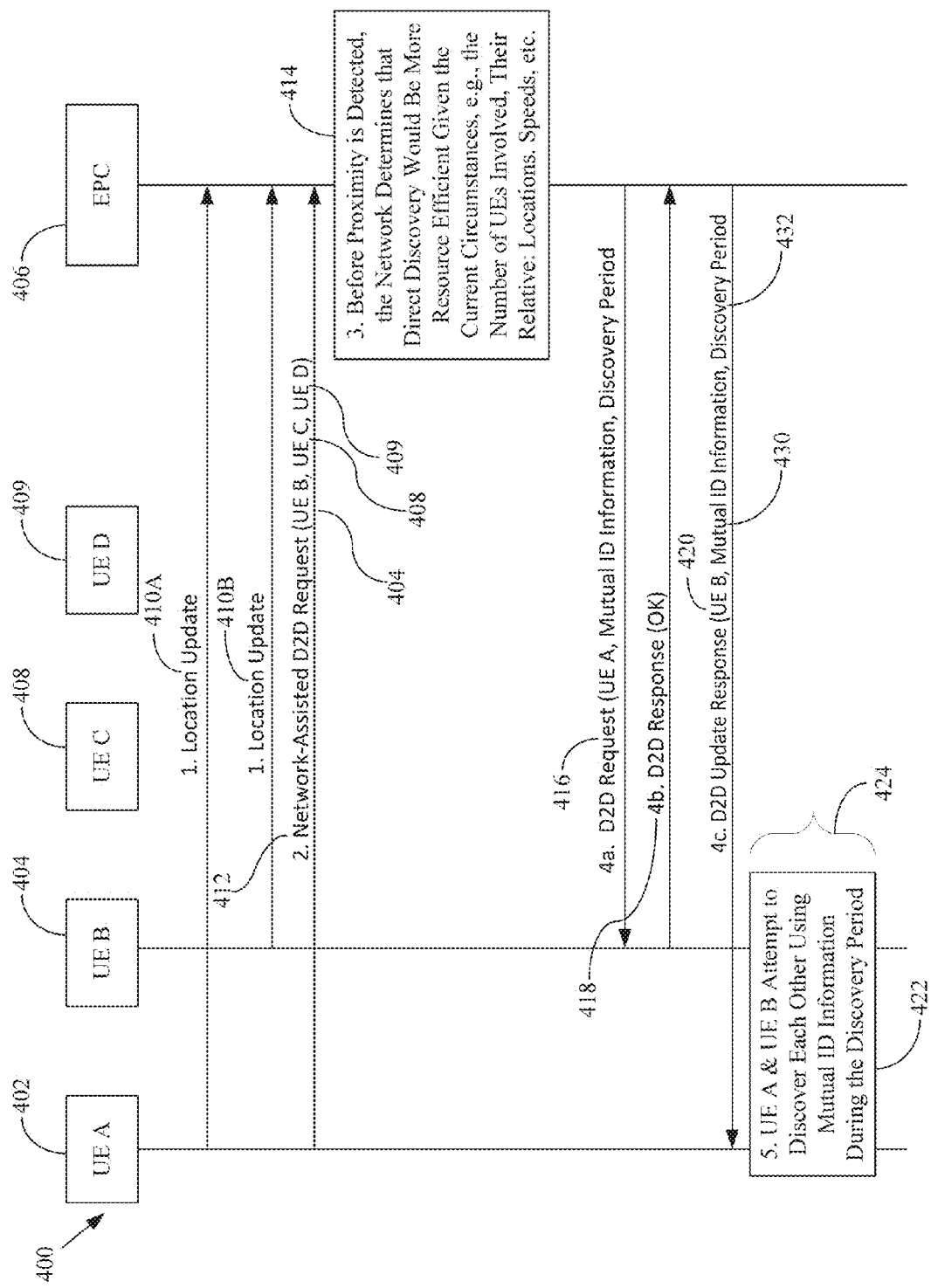
FIG. 4 illustrates a network-assisted to direct device discovery switch according to an embodiment.

FIG. 4 illustrates a network-assisted to direct device discovery switch 400 according to an embodiment. The data sequence 400 is illustrated as providing for the establishment of a D2D connection between the UE A 402 and the UE B 404 when there is no pre-existing data flow or connection established through the EPC 406 between the pair.

First, the UE A 402 and the UE B 404 may perform intermittent location updates with the EPC 406 (operations 410A, 410B). The location updates enable the EPC 406 to be informed of the current location for each of the UE A 402 and the UE B 404. In some examples, information communicated in the location updates includes a position associated with a network coverage area, a position associated with a broader geographic area of the UE, or a specific determined geographical position. In other examples, the location updates include information related to the portion of the network in communication with the UE. Other techniques may be used to determine whether the UEs are not in proximity. For example, if the UE A 402 is attached to a PLMN that is not co-located with the PLMN that the UE B 404 is attached to, then the EPC 406 can conclude that the UEs are not in proximity for D2D communications.

Next, the EPC 406 receives a notification that the UE A 402 wants to communicate with the UE(s) listed in the message. This notification may occur via a direct request from the UE A 402, transmitted within a network-assisted D2D request message 412, or may occur via a high-level notification in the core network. This notification may indicate a one-time only event, or it may indicate to keep trying until some period of time lapses if a UE is not currently in proximity. The network-assisted D2D request message 412 may provide an indication to verify the location of one or more specific UEs, groups of UEs, or any D2D-capable UEs. For example, as illustrated in FIG. 4, the network-assisted D2D request message 412 is issued for multiple UEs, e.g., UE B 404, as well as UE C 408 and UE D 409. The network-assisted D2D request message 412 may indicate whether UE A 402 wants to know if a specific UE (or type of UE) is in proximity, or whether the UE wants to receive assistance from the carrier network in the direct discovery process, e.g., to obtain identification and common discovery period information for establishing the direct D2D communication link.

Before proximity is detected, the network determines that direct discovery would be more resource efficient given the current circumstances 414, e.g., the number of UEs involved, their relative locations and speeds, etc. The triggers the EPC 406 uses for making this switch may be set by the operator and may be based on considerations such as the amount of overhead involved in determining UE locations, the accuracy of location estimations, the overhead used for Direct Discovery, etc. For example, this scenario may be particularly relevant in public safety/disaster relief scenarios where UE B 404, UE C 408 and UE 409 are converging on the same emergency scene where requesting UE 402 is located. Accordingly, network-assisted device discovery may be combined with direct discovery to provide the most efficient scheme for each use case. Information obtained from the UE location updates, e.g., operations 410A, 410B, may be taken into consideration by the EPC 406 for this determination. In other examples, the network operator may base proximity on whether UEs are associated with the same eNodeB or in communication with particular eNodeBs or network subsystems, for example.

In one scenario, the EPC 406 may check existing UE information databases to verify if UE A 402 can connect with the UEs it requested. In another scenario, a connection request and response exchange may be conducted between the EPC 406 and any potential device (e.g., the UE B 404) indicated for connection in the notification. This may include transmission of a D2D connection request 416 to the UE B 404, requesting confirmation to attempt establishment of a D2D connection. The confirmation or denial to attempt establishment of a D2D connection may be indicated in a transmission of a D2D connection response 418 returned to the EPC 406.

Having determined, before detecting UE A 402 and UE 404 are in proximity, that direct discovery would be more resource efficient given the current circumstances, the network, and that the connection request to the UE B 404 is confirmed, the EPC 406 transmits a UE discovery response 420 to UE A 402, i.e., the discovering device. The EPC 406 may also send the UE discovery response to UE B 404 so both UEs are informed to engage in discovery operations at a specific time, which device identifier to look for, and like discovery information. Thus, the UE discovery response may include mutual identifying information 430 to enable UE A 402 and UE B 404 to find each other during a D2D discovery procedure. The UE discovery response may also include information related to a mutual or common discovery period 432 to expedite the discovery process or otherwise coordinate discovery timing. In some examples, the EPC 406 may first wait for the UE B 404 to confirm the D2D connection request 418 before proceeding with sending the discovery information to the UE A 402; in other examples a policy-based determination may be made whether to confirm the D2D connection request on behalf of the UE B 404.

Using information obtained from the EPC 406, the UE A 402 and the UE B 404 perform operations to establish the D2D communication link 422, including D2D discovery and connection establishment. The timing of the operations to establish the D2D communication link may be provided in connection with a discovery period 424. As suggested above, the EPC can coordinate the discovery timing and provide an indication of the discovery period 424 to UE A 402 and UE B 404; in other examples, the EPC 406 may first try to negotiate with each of the UEs to establish a mutual agreement for the discovery period 424. The discovery and connection establishment timing may be indicated by a start time, a start and finish time, or other signaling.

In connection with operation 422, UE 402 and UE 404 attempt to discover each other and establish the D2D communication link during the proposed discovery period 424 using the identification information provided by the EPC 406. A failure to establish the communication link may be communicated to the EPC 406 (and used to obtain additional information to retry establishment of the D2D communication link), or connect to another UE.

Figure 5:
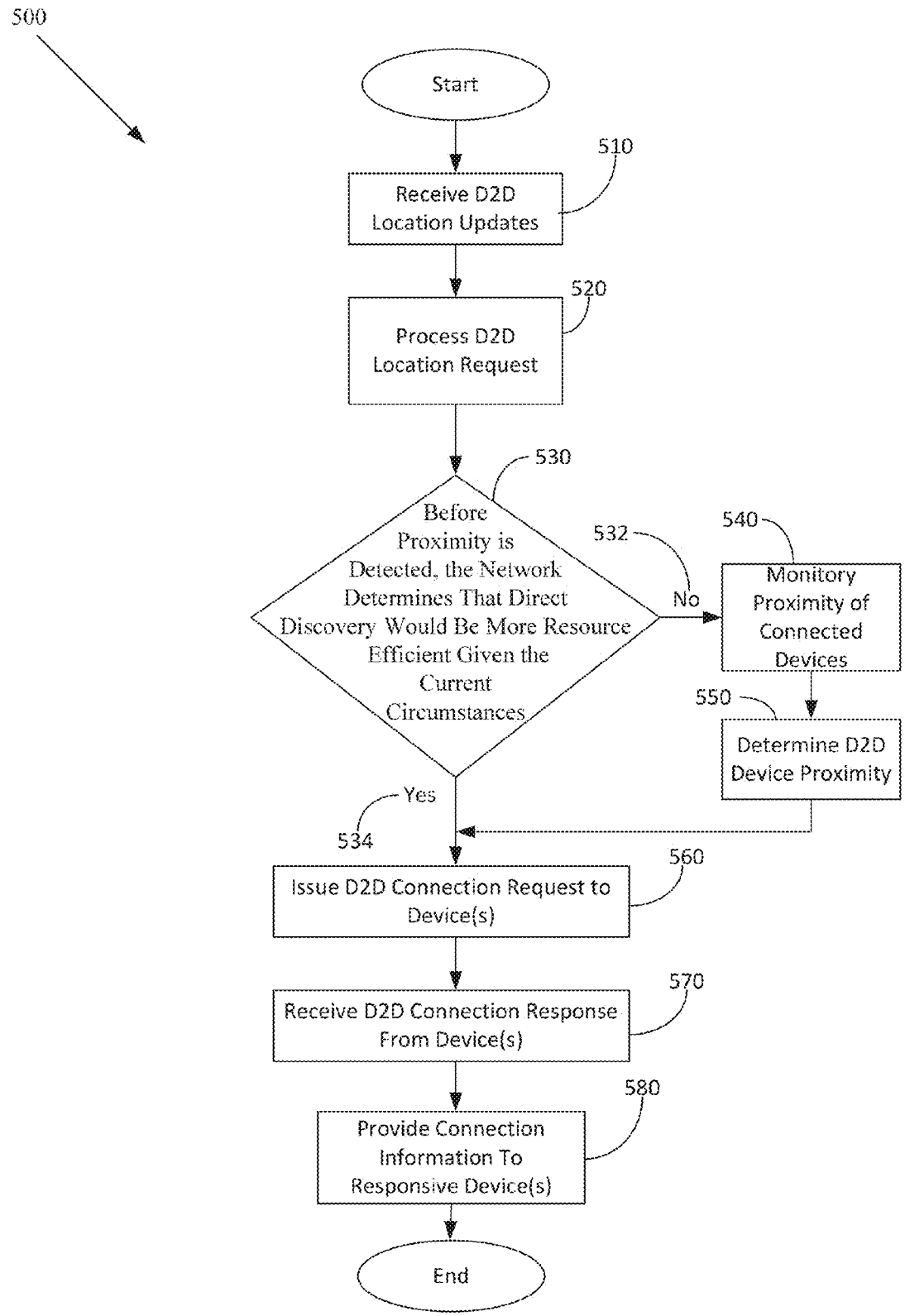
FIG. 5 is a flowchart for a method for performing a network-assisted to direct device discovery switch according to an embodiment.

FIG. 5 is a flowchart 500 for a method for performing a network-assisted to direct device discovery switch according to an embodiment. D2D location updates are received by the network, e.g., EPC. A D2D location request is received 510 and processed 520. A determination is made whether the network has determined that direct discovery would be more resource efficient given the current circumstances before proximity is detected 530. If no 532, the network continues to monitor for proximity of connected devices 540. The network determines D2D device proximity 550. The network then issues D2D connection request(s) to the device(s) 560.

If the network determined that direct discovery would be more resource efficient given the current circumstances before proximity is detected 534, the network then issues D2D connection request(s) to the device(s) 560. After issuing D2D connection request(s) to the device(s) 560, the network receive D2D connection response messages from device(s) 570. Connection Information is then provided to responsive device(s) 580.

Figure 6:
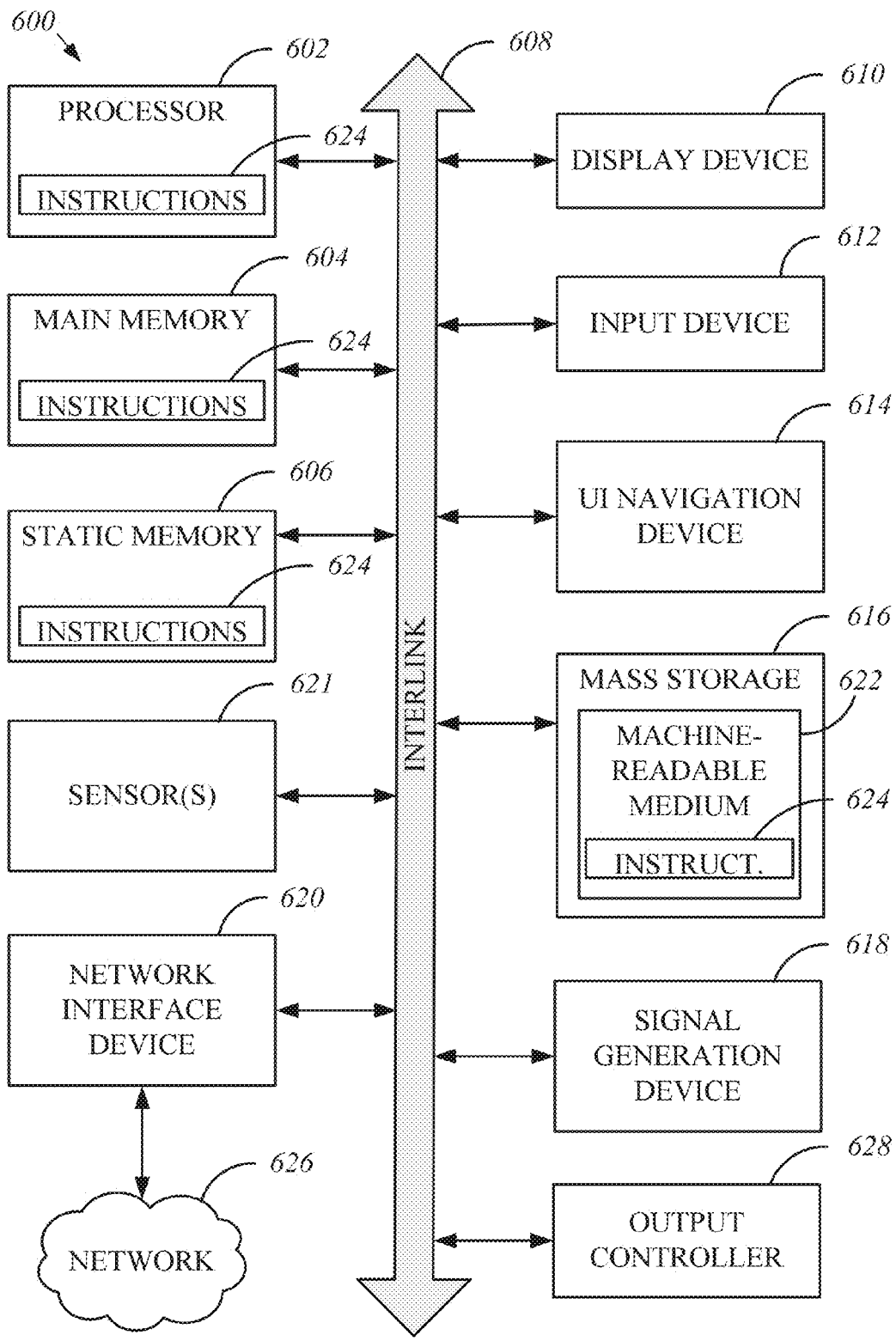
FIG. 6 illustrates a block diagram of an example machine for performing a network-assisted to direct device discovery switch according to an embodiment.

FIG. 6 illustrates a block diagram of an example machine 600 for performing a network-assisted to direct device discovery switch according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine and/or a client machine in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 602 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 602 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 600 may include a hardware processor 602 (e.g., a central processing unit (CPU), a graphics processing unit (GPU), a hardware processor core, or any combination thereof), a main memory 604 and a static memory 606, at least some of which may communicate with others via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, at least partially, additional machine readable memories such as main memory 604, static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects. The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for establishing a device-to-device (D2D) wireless connection, comprising:
   providing, by a first user equipment (UE), location information of the first UE to an Evolved Packet Core (EPC) of a first wireless network;
   providing, by a second UE, location information of the second UE to the EPC of the first wireless network;
   providing, from the first UE to the EPC, a D2D request message for establishing a network-assisted D2D wireless connection with the second UE, the D2D request message comprising a window time period within which the network-assisted D2D wireless connection is to keep attempting to be established if the second UE is out of D2D range of the first UE when the D2D request message is provided;

receiving, by the second UE, a D2D request from the EPC requesting proximity confirmation in an attempt to establish the D2D wireless connection with the first UE;

providing, from the second UE to the EPC, a D2D response message confirming proximity between the first UE and the second UE; and receiving, by the first UE, a D2D update response message from the EPC that indicates direct discovery is more resource efficient than providing network-assisted D2D discovery, the D2D update response message comprising data indicating the first UE is to perform direct discovery of the second UE and a discovery period for establishing the D2D wireless connection, wherein determining direct discovery is more resource efficient than providing network-assisted D2D discovery occurs before proximity between the first UE and the second UE is detected and is based on at least one of an amount of overhead involved in determining UE locations, an accuracy of location estimations, or an amount of overhead used for direct discovery.

2. The method of claim 1, further comprising receiving a D2D update response message from the EPC providing information to the first UE for performing direct discovery of the second UE.

3. The method of claim 2, further comprising performing direct discovery of the second UE by the first UE based on the information provided by the D2D update response message from the EPC, wherein the receiving the D2D update response message from the EPC further comprises receiving mutual identifying information for enabling the first UE and the second UE to find each other and information related to a discovery period.

4. The method of claim 1, wherein the D2D request message further comprises an indication for the EPC to verify a location of one of: a plurality of specific UEs, a plurality of specific groups of UEs or any D2D-capable UEs.

5. The method of claim 1, wherein the providing location information of the first UE to the EPC of the first wireless network further comprises providing location information of the first UE to the EPC of a 3GPP Long Term Evolution or 3GPP Long Term Evolution-Advanced (LTE/LTE-A) wireless network.

6. The method of claim 1, wherein the D2D request message further comprises an indication for the EPC to verify a location of a specific type of UE.

7. A method performed by a network entity, comprising:
receiving location information from at least a first and a second user equipment (UE);
receiving a device-to-device (D2D) request from the first UE for establishing a network-assisted D2D wireless connection with the second UE, the D2D request message comprising a window time period within which the network-assisted D2D wireless connection is to keep attempting to be established if the second UE is out of range of the first UE when the D2D request message is provided;
providing a D2D request message to the second UE to request confirmation of an attempt to establish the D2D wireless connection with the first UE;
receiving, from the second UE, a D2D response message confirming or denying the attempt to establish the D2D wireless connection with the first UE;
determining proximity of the first UE and the second UE in response to reception of the D2D response message confirming the attempt to establish the D2D wireless connection with the first UE;

determining direct discovery is more resource efficient than providing network-assisted D2D discovery before proximity between the first UE and the second UE is detected and is based on at least one of an amount of overhead involved in determining UE locations, an accuracy of location estimations, or an amount of overhead used for direct discovery; and providing a D2D update response message to the first UE, the D2D update response message including data indicating the first UE is to perform direct discovery of the second UE and a discovery period for establishing the D2D wireless connection.

8. The method of claim 7 further comprising receiving a D2D response message from the second UE, wherein the D2D response message comprises a denial by the second UE for the network entity to attempt establishment of a D2D wireless connection.

9. The method of claim 7 further comprising transmitting to the second UE the D2D update response message to inform the first UE and the second UE to engage in discovery operations, the D2D update response message comprising discovery information comprising which device identifier to look for and the discovery period to coordinate discovery timing between the first UE and the second UE.

10. The method of claim 7, wherein the determining during the time period direct discovery is more resource efficient than providing network-assisted D2D discovery is further based on a number of UEs included in the received network-assisted D2D request and occurs before proximity between the first UE and the second UE is detected.

11. The method of claim 9, further comprising, prior to sending the discovery information to the first UE, making a policy-based determination whether to confirm the D2D request on behalf of the second UE free from confirming the D2D request with the second UE.

12. The method of claim 7, further comprising confirming whether the second UE will allow establishment of a D2D connection prior to determining the proximity of the first UE and the second UE.

13. A first user equipment (UE), comprising:
a multi-mode transceiver comprising circuitry arranged to perform a wireless communications with an evolved NodeB (eNB) and with a second UE via a device-to-device (D2D) connection, the circuitry further arranged to facilitate a D2D connection for direction communications between the first UE and a second UE, by performing operations to:
provide, by the first UE, location information of the first UE to an Evolved Packet Core (EPC) of a first wireless network;
provide, from the first UE to the EPC, a D2D request message for establishing a network-assisted D2D wireless connection with the second UE, the D2D request message comprising a window time period within which the network-assisted D2D wireless connection is to keep attempting to be established if the second UE is out of D2D range of the first UE when the D2D request message is provided; and
receive, by the first UE, a D2D update response message from the EPC that indicates direct discovery is more resource efficient than providing network-assisted D2D discovery, the D2D update response message comprising data indicating the first UE is to perform direct discovery of the second UE and a discovery period for establishing the D2D wireless connection, wherein the D2D update response message is received from the EPC after location information and a D2D response message confirming proximity between the first UE and the second UE is received at the EPC from the second UE, the D2D response message received in response to a D2D request message transmitted from the EPC to the second UE for requesting proximity confirmation in attempting to establish the D2D wireless connection with the first UE;

wherein determining direct discovery is more resource efficient than providing network-assisted D2D discovery occurs before proximity between the first UE and the second UE is detected and is based on at least one of an amount of overhead involved in determining UE locations, an accuracy of location estimations, or an amount of overhead used for direct discovery.

14. The user equipment of claim 13, wherein the D2D update response message from the EPC further comprises information for performing direct discovery of the second UE.

15. The user equipment of claim 13, further comprising performing direct discovery of the second UE by the first UE based on the information provided by the D2D update response message from the EPC.

16. The user equipment of claim 14, wherein the receiving the D2D update response message from the EPC further comprises receiving mutual identifying information for enabling the first UE and the second UE to find each other and information related to the discovery period.

17. The user equipment of claim 13, wherein the providing location information of the first UE to the EPC of the first wireless network further comprises providing location information of the UE to the EPC of a 3GPP Long Term Evolution or 3GPP Long Term Evolution-Advanced (LTE/LTE-A) wireless network.

18. An evolved packet core (EPC), comprising:
components for providing communications on a wireless network, the components arranged to operate processing components to establish a network communication link between a first user equipment (UE) and a second UE via one or more evolved Node Bs (eNODEBs), and the components arranged to facilitated an establishment of a device-to-device communication link between the first UE and a second UE over a second wireless network, by performing operations to:
receive location information from at least the first UE and the second UE;
receive a device-to-device (D2D) request from the first UE for establishing a network-assisted D2D wireless connection with the second UE, the D2D request message comprising a window time period within which the network-assisted D2D wireless connection is to keep attempting to be established if the second UE is out of range of the first UE when the D2D request message is provided;
provide a D2D request message to the second UE for requesting proximity confirmation in an attempt to establish the D2D wireless connection with the first UE;
receive a D2D response message from the second UE confirming or denying the attempt to establish the D2D wireless connection with the first UE;
determine proximity of the first UE and the second UE in response to reception of the D2D response message confirming the attempt to establish the wireless connection;
determine direct discovery is more resource efficient than providing network-assisted D2D discovery before proximity between the first UE and the second UE is detected and is based on at least one of an amount of overhead involved in determining UE locations, an accuracy of location estimations, or an amount of overhead used for direct discovery; and
provide a D2D update response message to the first UE, the D2D update response message including data indicating the first UE is to perform direct discovery of the second UE and a discovery period for establishing the D2D wireless connection.

19. The evolved packet core of claim 18, wherein the D2D response message comprises a denial by the second UE for the EPC to attempt establishment of a the D2D connection.

20. The evolved packet core of claim 18, wherein the components are further arranged to determine direct discovery is more resource efficient than providing network-assisted D2D discovery based on a number of UEs included in the received network-assisted D2D request.

21. The evolved packet core of claim 18, wherein the components are further arranged to operate processing components of a 3GPP Long Term Evolution or 3GPP Long Term Evolution-Advanced (LTE/LTE-A) wireless network.

22. A non-transitory computer-readable storage medium comprising contents that, when executed by a computing system, cause the computing system to perform the operations to:
provide, by a first user equipment (UE), location information of the first UE to an Evolved Packet Core (EPC) of a first wireless network;
provide, from the first UE to the EPC, a D2D request message for establishing a network-assisted D2D wireless connection with the second UE, the D2D request message comprising a window time period within which the network-assisted D2D wireless connection is to keep attempting to be established if the second UE is out of D2D range of the first UE when the D2D request message is provided;
receive, by the first UE, a D2D update response message from the EPC determining that direct discovery is more resource efficient than providing network-assisted D2D discovery, the D2D update response message comprising data indicating the first UE is to perform direct discovery of the second UE and a discovery period for establishing the D2D wireless connection,
wherein the D2D update response message is received from the EPC after location information and a D2D response message confirming proximity between the first UE and the second UE is received at the EPC from the second UE, the D2D response message received in response to a D2D request message transmitted from the EPC to the second UE for requesting proximity confirmation in attempting to establish the D2D wireless connection with the first UE,
wherein determining direct discovery is more resource efficient than providing network-assisted D2D discovery occurs before proximity between the first UE and the second UE is detected and is based on at least one of an amount of overhead involved in determining UE locations, an accuracy of location estimations, or an amount of overhead used for direct discovery.

23. The non-transitory computer readable storage medium of claim 22, wherein the D2D update response message from the EPC further comprises information for enabling the first UE to find the second UE and information related to the discovery period.

\* \* \* \* \*